3,044,875
CYANINE DYES DERIVED FROM THIENYLBENZ-OXAZOLES AND SILVER HALIDE EMULSIONS SENSITIZED THEREWITH

Johannes Götze, Koln-Stammheim, Germany, assignor to Agfa Aktiengesellschaft, Leverkusen, Germany, a corporation of Germany
No Drawing. Filed July 29, 1958, Ser. No. 751,621
Claim priority, application Germany Aug. 16, 1957
10 Claims. (Cl. 96—105)

The present invention relates to new cyanine dyestuffs and to silver halide emulsions sensitized therewith.

For sensitizing silver halide emulsions, especially in the orthochromatic range, it is already known to use cyanine dyes which are derived from 2-methyl benzoxazole or from substituted 2-methyl benzoxazoles. For example, sensitizing dyes which are derived from 2-methyl naphthoxazole have already been mentioned in German patent specification No. 724,608. Alkyl-substituted and hydroxyalkyl-substituted benzoxazole dyes are known from German patent specification Nos. 654,913 and 709,555 and dyes from 2-methyl-5-isoamylbenzoxazole are known from German patent specification No. 709,873. Those dyes which are derived from 2-methyl-5-phenyl benzoxazole and which are described in German patent specifications 714,764 and 936,644 have acquired particular significance. They are characterized by a particularly powerful sensitizing action, which is shown in a high sensitivity, for example in the yellow-green range of the spectrum, and in a steep fall in the sensitization curve towards the long-wave range.

It has now been found that cyanine dyes, especially acid cyanines, basic cyanines and neutrocyanines which are derived from 2-methyl-5-(α-thienyl)-benzoxazole show the same powerful sensitizing action as the phenyl-substituted dyes, which in certain cases is even intensified, and that these dyes absorb about 10 mμ further into the long wave range, so that also their sensitization maximum is displaced towards the longwave range as compared with the phenyl-substituted dyes. In this way, it is possible to sensitize spectral regions which it has not so far been possible to sensitize with such intensity. The new dyestuffs can be represented by the following general formulae:

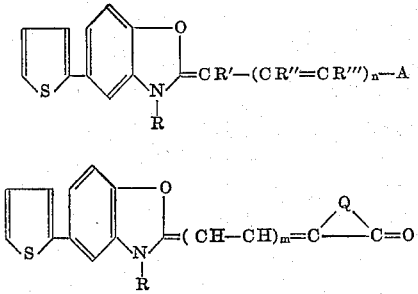

wherein:

R represents an organic radical usual in cyanine dye chemistry such as an alkyl, aralkyl, carboxylalkyl or sulphoalkyl radical, R', R" and R'" each represent a hydrogen atom or a substituent usual in cyanine dye chemistry such as an alkyl, aryl, aralkyl, heterocyclic or hydroxyalkyl radical;

A represents a 5-α-thienyl benzoxazole radical or another heterocyclic ring system usual in cyanine chemistry, such as substituted or unsubstituted benzthiazole, naphthiazole, thiazole, benzselenazole, selenazole, benzoxazole, naphthoxazole, quinoline ring system, Q represents the atoms needed for completing a heterocyclic ketomethylene ring, which in its turn can be linked by way of a methine group to a 5-α-thienyl benzoxazole ring or to another heterocyclic radical usual in cyanine dye chemistry, and $n$ and $m$ each represent 0, 1 or 2.

The dyes are produced by condensation of the quaternary salts of 2-methyl-5-(α-thienyl)-benzoxazole with intermediate products usual in cyanine dye chemistry and according to known processes, as will be more fully explained in the following examples.

The 2-methyl-5-(α-thienyl)-benzoxazole (VI) serving as starting material has not yet been described in the literature. It can be obtained by the method indicated in the following reaction scheme:

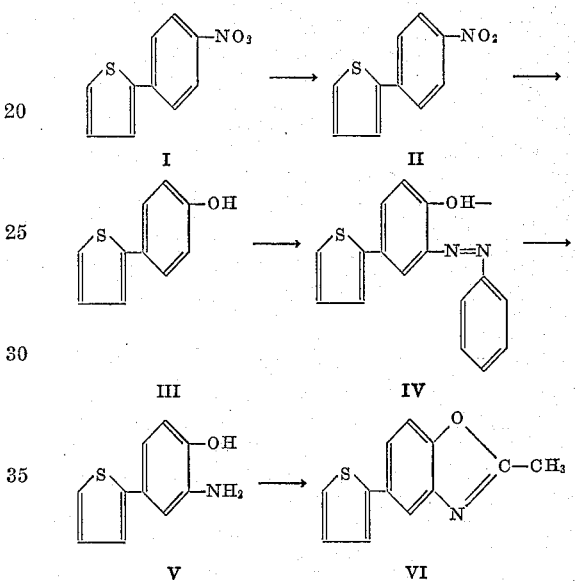

The p-nitrophenyl thiophene (I) serving as starting material has already been described in Journ. Amer. Chem. Soc., vol. 46, page 2343. The reduction to the p-aminophenyl thiophene (II) takes place in the following way:

30 g. of the nitro compound I are stirred to form a paste with approximately 75 cc. of methanol or acetone. This mixture is added in portions to a hot solution of 120 g. of stannous chloride in 120 cc. of concentrated hydrochloric acid. When the addition is complete, the mixture is left to stand for 15 minutes on a steam bath, whereupon it is cooled and the precipitated tin double salt is filtered off with suction, washed with water and dried. Said salt is decomposed by means of aqueous NaOH solution to obtain the free base which is filtered with suction, water-washed, and dried. For purification purposes, the crude amine recovered from the precipitate can be distilled with steam. The pure base melts at 72° C. and its acetyl derivative has a melting point of 189° C. For conversion into the p-hydroxyphenyl thiophene (III), the base is diazotised at 40° C. in substantially 40% sulphuric acid by addition of sodium nitrite and the diazo solution obtained is introduced into boiling copper sulphate solution, the phenol separating out after boiling for a short time. For purification purposes, it is dissolved in an alkali metal hydroxide solution, re-precipitated with acid and extracted with ether. The ether extract is recrystallised from ligroin. The phenol (III) melts at 145° C.

To produce the azo dye (IV), the phenol (III) is dissolved in dilute sodium hydroxide solution, and the equivalent quantity of diazotized aniline is run at 5–10° C. into this solution. The azo dye separating out is filtered off with suction, washed with water and immediately further processed.

The azo dye (IV) obtained for example from 17 g. of p-hydroxy phenyl thiophene (III) is heated slightly with 150 cc. of ethanol and 20 cc. of sodium hydroxide solution and the mixture is introduced into a hot solution of 150 g. of sodium hydrosulphite, 300 cc. of water and 80 cc. of sodium hydroxide solution. After the solution has become decolorized, another 300 cc. of water are added, the solution is allowed to cool and it is then brought to a pH value of approximately 5 and the hydroxy-amino-phenyl thiophene (V) is filtered off with suction.

To produce the new thienyl benzoxazole (VI), 20 g. of the hydroxy amine are boiled for several hours with 150 cc. of acetic anhydride. The anhydride is then distilled off and the residue distilled in vacuo. During a first distillation, a fraction boiling at 130–210° C. at a pressure of 1 mm. is collected; this product is re-distilled at 0.5 mm., whereupon the desired base (VI) distils over at 140–152° C. and solidifies in the receiver. After being recrystallized from methanol, the 2 - methyl-5-(α-thienyl)-benzoxazole has a melting point of 75° C. Analysis produced the following results:

The calculated values for a compound $C_{12}H_9ONS$ (VI) were:

C, 66.9%; H, 4.2%; O, 7.4%; N, 6.5%; S, 14.9%

The values found were:

C, 66.8%; H, 4.3%; O, 7.7%; N, 6.9%; S, 14.9%

The new base can be converted in the usual manner, for example by heating for one hour at 130° C. with p-toluene sulphonic acid ethyl ester, or with other quaternization agents such as dimethyl sulphate, alkylchlorides, alkyl bromides, alkyliodides, butanesultone or iodopropionic acid, into quaternary salts of for example the Formula VII or VIII.

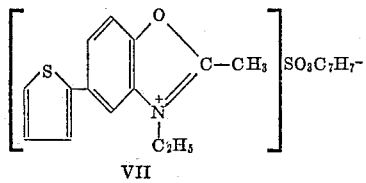

VII

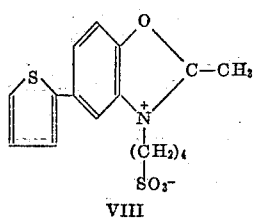

VIII

The quaternary salts are distinguished by high reactivity and may be transformed by methods known as such into cyanine dyes. By way of example there are cited the following methods:

Asymmetrical 2,2′ - monomethinecyanines (pseudocyanines) are obtained by condensing the above quaternary salts with quaternary salts of heterocyclic nitrogen compounds which contain an alkyl mercapto, preferably a methyl mercapto group in the alpha or gamma position, suitable heterocyclic nitrogen compounds being for instance substituted or unsubstituted, benzthiazoles, naphthiazoles, thiazoles, benzselenazoles, selenazoles, benzoxazoles, naphthoxazoles, quinolines. In addition to the alkylmercapto group the compounds may have as substituent groups one or more of the following: alkoxy, halogen, alkyl, aryl, aralkyl, amino or substituted amino.

The dyes derived from alpha alkyl mercapto compounds, correspond to the general formula:

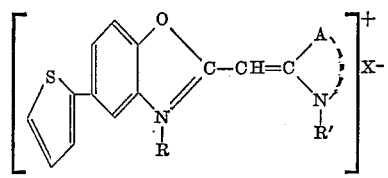

wherein

R and R′ stand for a substituted or unsubstituted alkyl group such as methyl, ethyl, propyl, butyl,

—CH.CH$_2$—COOH

—(CH$_2$)$_n$—SO$_3$H ($n=2$, 3, 4) or —(CH$_2$)$_n$—SO$_3^-$ in case that the sulfonic acid group is the anionic group, A stands for the atoms necessary to complete a heterocycle ring as defined above, X stands for an anion, such as $Cl^-$, $Br^-$, $I^-$, $ClO_4^-$, $SO_4.CH_3^-$, $C_7H_7.SO^-$.

Symmetrical monomethinecyanines are obtained by condensing the above quaternary salts by means of amylnitrite in glacial acetic acid.

Symmetrical carbocyanines are produced by condensing the quaternary salts by ethyl orthoformate in pyridine solution. For obtaining asymmetrical carbocyanines that are unsubstituted in the trimethine chain the quaternary salts are condensed with quaternary salts of heterocyclic nitrogen bases of the aforementioned type which are substituted in alpha-position by an acylarylaminovinyl group such as an acetylphenylaminovinyl group. Symmetrical carbocyanines which are substituted at the middle carbon atom of the trimethine chain by an alkyl group are obtained by condensing the quaternary thienyl bases with an ortho ester of acetic acid or of a higher fatty acid such as ethyl orthoacetate in pyridine solution. By condensing the above quaternary salts with quaternary salts of heterocyclic nitrogen bases which contain in alpha-position the group

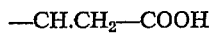

Asymmetrical carbocyanines are obtained which are substituted in trimethine chain by an alkyl group.

Symmetrical pentamethine-, heptamethine- and nonamethinecyanines may also be obtained from the quaternary thienyl bases by known methods such as by condensing said bases with aniline acroleine anil or gutaconic aldehyde dianilide in alcoholic solution with sodium ethoxide.

Merocyanines may be obtained by condensing the quaternary salts of the above thienylbenzthiazoles with compounds of the formula:

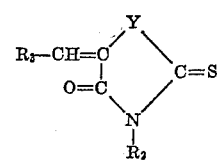

wherein $R_2$ stands for alkyl, such as methyl, ethyl, propyl, $R_3$ stands for an alkoxy or an anilino group and Y stands for oxygen or sulfur.

These merocyanines correspond to the general formula:

VI

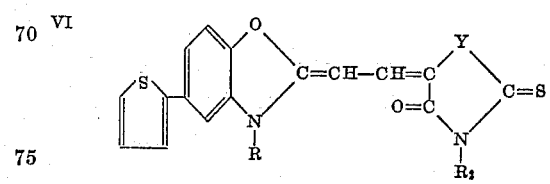

wherein R, R₂ and Y have the same meaning as in the preceding formulae.

These merocyanines can be quaternized by known quaternizing agents such as dimethylsulfate, ethyl paratoluene-sulphonate, and the quaternary salts may be reacted with heterocyclic nitrogen compounds having an active methyl group in alpha-position to produce rhodacyanines of the following general formula:

VII

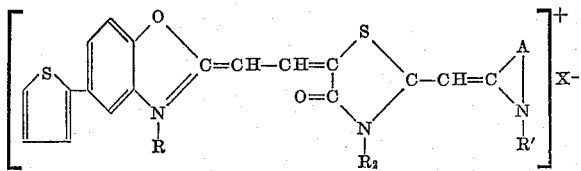

wherein R, R', R₂, A and X⁻ have the same meaning as in the preceding formula.

It is furthermore possible to condense any other known quaternary merocyanine salts such as those of the formula

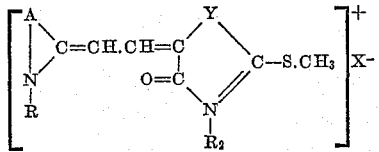

with one of the above quaternary salts of thienyl benzoxazole whereby rhodacyanines of the following formula are obtained.

VIII.

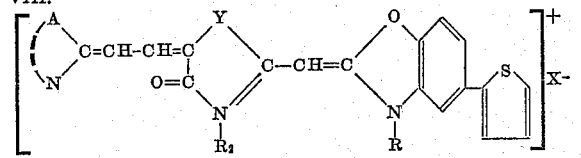

Another type of dyestuffs which may be obtained from the present quaternary salts according to methods known per se are the isocyanines of the formula

IX.

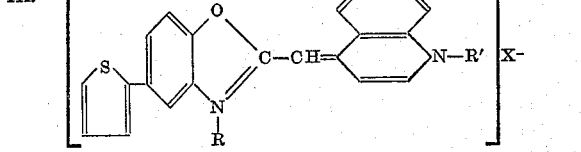

In the absorption, the new dyes are clearly displaced further towards the red than the corresponding known phenyl-substituted dyes and they have a much more intense color than the unsubstituted dyes.

The new sensitizers are suitable for black-and-white and for color silver halide emulsion and are added to said emulsions in amounts of about 0.005 to 0.05 g. per kg. of emulsion.

The dyes according to the invention do not show any tendency to fogging. The photographic silver halide layers sensitized therewith are stable to storage and do not show any decrease in sensitivity when kept in a heating chamber.

The process will now be explained by reference to the following examples.

*Example 1*

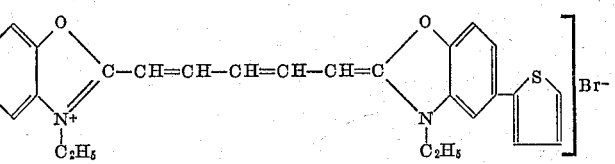

5 g. of 2-methyl-5-thienyl benzoxazole and 3 g. of butanesultone are heated for 90 minutes at 140° C. The reaction product is worked up with acetone and is a yellow water-soluble powder. 4 g. of this powder are heated with 5 cc. of pyridine, 4 cc. of orthoformic acid ethyl ester and 0.5 cc. of acetic anhydride for one hour at 115–120° C. The mixture is allowed to cool, the greasy dye is dissolved in methanol and the dye is precipitated by pouring into dilute sodium chloride solution. It is filtered off with suction and recrystallized from methanol. The dye dissolves readily in water and sensitizes a silver iodobromide emulsion with a maximum at 542 mμ (0.04 g. of dyestuff added to 1 kg. of emulsion).

*Example 2*

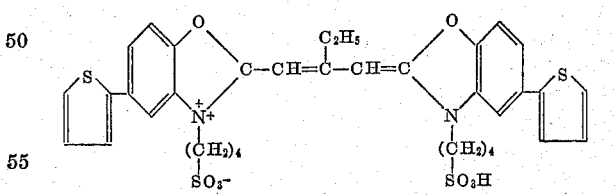

2.3 g. of 2-methyl-5-thienyl benzoxazole and 2 g. of p-toluene sulphonic acid ethyl ester are heated in an oil bath for 1½ hours at 140° C. After working up with acetone, there are obtained 3 g. of 2-methyl-3-ethyl-5-thienyl benzoxazoliumtosylate. This is boiled for about 3 minutes with 20 cc. of pyridine and 3 cc. of ethoxy acrolein acetal and added to dilute potassium bromide solution. The precipitate is filtered off with suction and recrystallised from methanol.

The absorption maximum of the dye is at 600 mμ and the sensitisation maximum with a silver bromide emulsion at 630 mμ, 0.005 g. of dyestuff per 1 kg. of emulsion).

*Example 3*

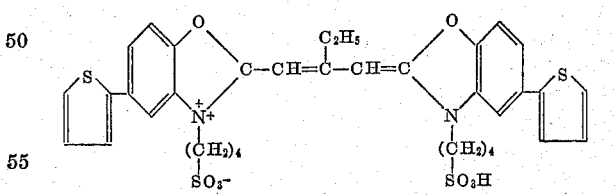

12 g. of a quaternary salt of 2-methyl-5-thienyl benzoxazole and butanesultone as described in Example 1 are boiled for 3 hours with pyridine and orthopropionic ester (12 cc.). The resulting dye is precipitated by pouring the liquid into dilute sodium chloride solution, and is filtered off with suction and recrystallised from a mixture of methanol and ethanol. The dye is filtered off with suction and washed with a mixture of ethanol and propanol. The dye absorbs in alcohol at 510 mμ, while in water the dye has an extremely intense absorption maximum at 570 mμ, which can be clearly detected even in extremely dilute form and can serve for the recognition of minute traces of dye. The sensitisation maximum with a silver iodobromide emulsion is at 565–570 mμ with a steep drop towards the longer wavelengths. The dye can also be used for sensitizing color film emulsions which contain the usual color components.

Example 4

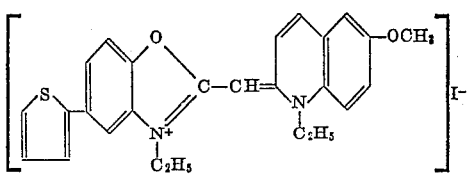

2 g. of 2-methyl-thienyl benzoxazole and 2 g. of ethyl toluenesulphonate are heated for about 1½ hours in an oil bath at 120° C. The resulting quaternary salt is washed with acetone and immediately further condensed. The product is dissolved in 20 cc. of pyridine, and 1.7 g. of 1-ethyl-2-methyl-mercapto-6-methoxy-quinoline ethyl toluenesulphonate and 5 cc. of pyridine are added, whereupon the mixture is boiled for 10 mintues and then poured into dilute potassium iodide. The solid which separates out can be recrystallised from ethanol. The dye has a sensitisation maximum at 505 mμ with a silverchlorobromide emulsion and the sensitization curve falls steeply towards the long-wave range (0.025 g. of dyestuff per 1 kg. of emulsion the silver salt of which consists of 25% silver bromide and 75% silver chloride).

Example 5

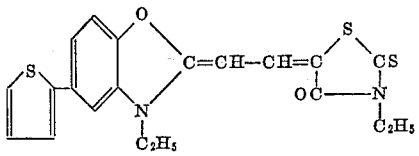

4.1 g. of 2-methyl-3-ethyl-5-thienyl-benzoxazole tosylate as described in Example 2, 2.3 g. of 3-ethyl-5-ethoxy methylene rhodanene and 30 cc. of pyridine are heated in an oil bath for 40 minutes at 125° C. The resulting mixture is filtered while hot and the filtrate is left overnight in a refrigerator. The precipitate is filtered off with suction and recrystallised from a mixture of chloroform and methanol. Sensitization maximum with a silver bromide emulsion 560 mμ (0.025 g. of dyestuff per 1 kg. of emulsion).

Example 6

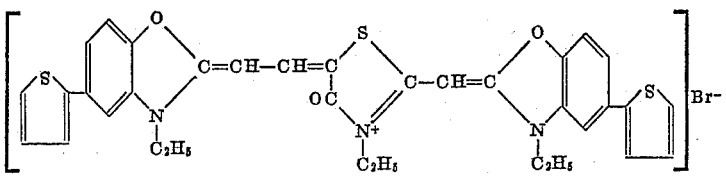

2 g. of the dimethine merocyanine according to Example 5 are heated for a short time with 0.8 cc. of dimethyl sulphate at 120° C. The internal temperature of the mixture rises to 125° C. Thereafter, 12 cc. of pyridine and 2 g. of the 2-methyl-3-ethyl-5-thienyl benzoxazole tosylate described in Example 2 are added and the temperature is kept for 35 minutes at 120° C. By precipitation with dilute potassium bromide solution, the dye is isolated as an amorphous powder, and for purification purposes is recrystallized twice from ethanol. It is dissolved in ethanol to form a strongly fluorescing solution with an adsorption maximum at 570 mμ. The dye has a broad sensitization range in a silver iodobromide emulsion in which it is possible to detect two maxima at 550 and 590 mμ (0.015 g. of dyestuff per 1 kg. of emulsion).

The new dyes are suitable for sensitizing both black-and-white and color emulsions which contain dye components, since they are compatible with the dye components. They can be used alone or admixed with other known dyes, and in individual cases hypersensitization effects can occur.

Example 7

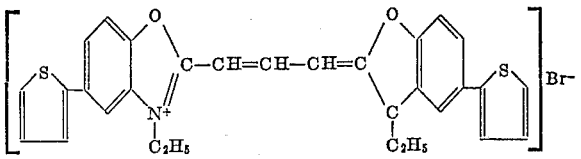

4.5 g. of 2-methyl-5-thienyl benzoxazole ethyl tosylate (see Example 2), 6 cc. of orthopropionic acid ethyl ester, 8 cc. of pyridine and 1 cc. of acetic acid anhydride are heated to about 120° C. for 1½ hours. The reaction mixture is poured into dilute aqueous potassium bromide solution and the precipitated dyestuff bromide is crystallized from methanol.

The sensitization maximum is at about 565 mμ (0.05 g. of dyestuff per 1 kg. of a silveriodobromide emulsion (5% silveriodide, 95% silverbromide).

Example 8

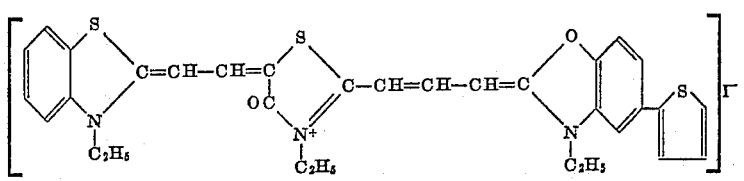

8.6 g. of 2-methyl-5-thienyl benzoxazole are heated with 15 g. of ethyl iodide on the water bath for some days. 5 g. of the quaternary salt of the following composition A are thus obtained (A)

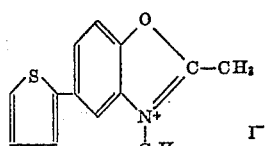

5 g. of this compound are heated to the boil for 20 mintues with 2.5 g. of diphenyl formamidine and 20 cc. of acetic anhydride. The reaction mixture is treated with acetone. The following compound B (2.1 g.; M.P.: 217° C.) is obtained.

(B)

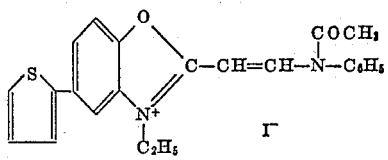

0.85 g. of this compound and 0.75 g. of the compound of the following composition which is described in the literature (see e.g. "Zeitschrift für allg. Chemie" (Russian), 1957, page 202).

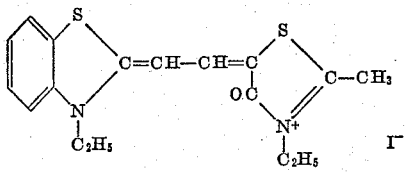

are heated to the boil for 5 minutes in 10 cc. of pyridine. The dyestuff formed precipitates already in the heat. After two hours the dyestuff is filtered off with suction, washed with water, acetone and ether and recrystallized from 75 cc. of chloroform. The dyestuff sensitizes with a maximum at 720 mµ (0.025 g. per 1 kg. of a silveriodobromide emulsion).

*Example 9*

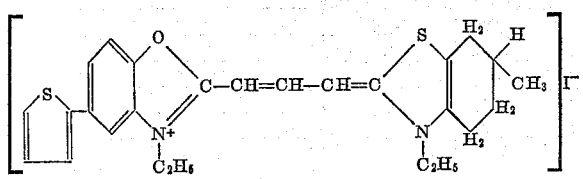

1/100 mol of the intermediate product B of Example 8, 1/100 mol of the 2,6-dimethyltetrahydrobenzthiazol-iodoethylate, 2.5 g. of sodium acetate and 50 cc. of acetic anhydride are heated to the boil for about 12 minutes and the reaction mixture is poured into water. After recrystallizing from methanol, the dyestuff has an absorption maximum at 505 mµ sensitizes vigorously in the orthochromatic range with a maximum at 560–570 mµ (0.040 g. per 1 kg. of silveriodobromide emulsion).

I claim:
1. A photographic silver halide emulsion optically sensitized with an effective amount of a cyanine dye containing a thienyl-substituted benzoxazole ring and being selected from these having the following formula:

(1)
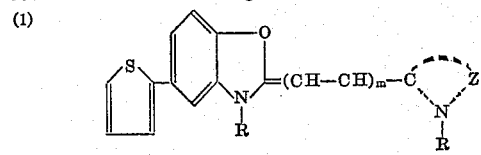

wherein R represents a member selected from the group consisting of lower alkyl and lower alkyl-substituted by sulfo groups; and (2)
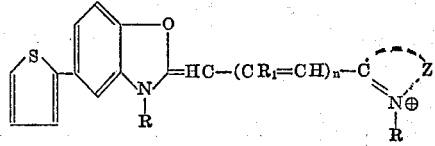

wherein the associated anion is a monovalent acid anion when R is lower alkyl, and wherein a betaine structure is formed when R is a sulfo-substituted lower alkyl; $R_1$ stands for a lower alkyl radical, Z represents the atoms necessary to complete a heterocyclic ring selected from the group consisting of benzthiazolyl, naphthiazolyl, thiazolyl, 2-sulfo-4-keto-thiazolidinyl, benzselenazolyl, selenazolyl, benzoxozolyl, 5-α-thienyl-benzoxazolyl, naphthoxazolyl, oxazolyl, quinolyl, 5-methoxy-quinolyl and methyltetrahydrobenzthiazolyl, and m and n are whole numbers from 0 to 2 inclusive.

2. A photographic silver halide emulsion optically sensitized with an effective amount of a cyanine dye having the formula:

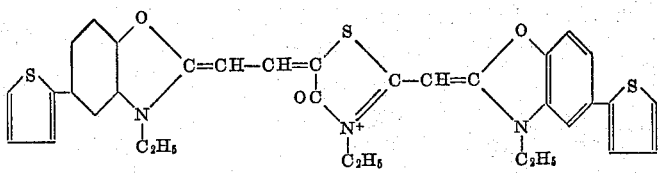

3. A photographic silver halide emulsion optically sensitized with an effective amount of a cyanine dye having the formula:

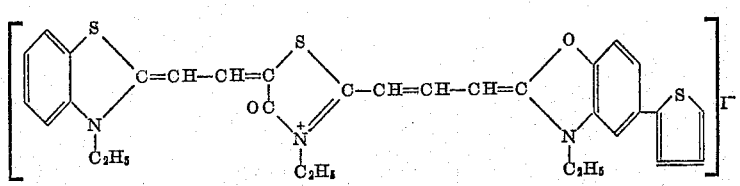

4. The optically sensitized silver halide emulsion of claim 1 in which the cyanine dye is:

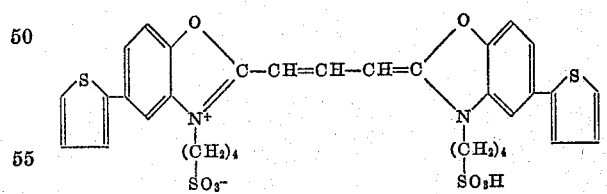

5. The optically sensitized silver halide emulsion of claim 1 in which the cyanine dye is:

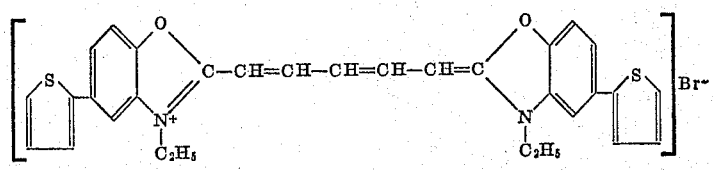

6. The optically sensitized silver halide emulsion of claim 1 in which the cyanine dye is:

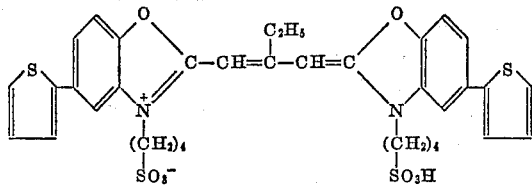

7. The optically sensitized silver halide emulsion of claim 1 in which the cyanine dye is:

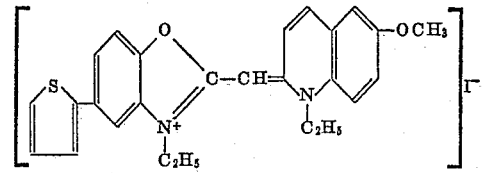

8. The optically sensitized silver halide emulsion of claim 1 in which the cyanine dye is:

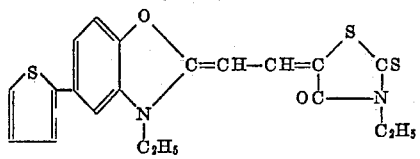

9. The optically sensitized silver halide emulsion of claim 1 in which the cyanine dye is:

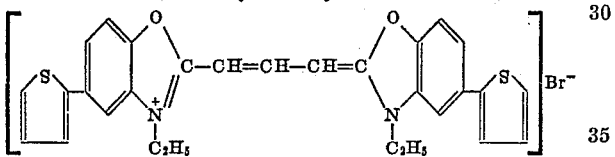

10. The optically sensitized silver halide emulsion of claim 1 in which the cyanine dye is:

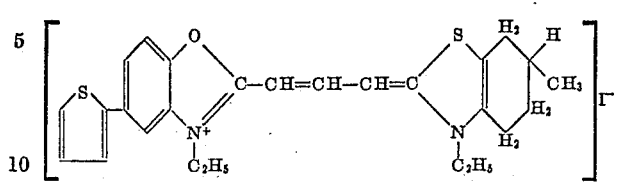

References Cited in the file of this patent
UNITED STATES PATENTS

| | | |
|---|---|---|
| 1,969,445 | Brooker | Aug. 7, 1934 |
| 2,060,383 | Schneider | Nov. 10, 1936 |
| 2,083,804 | Zeh | June 15, 1937 |
| 2,278,461 | Middleton | Apr. 7, 1942 |
| 2,395,879 | Kendall et al. | Mar. 5, 1946 |
| 2,403,723 | Kaiser | July 9, 1946 |
| 2,461,137 | Brooker | Feb. 8, 1949 |
| 2,471,996 | Anish | May 31, 1949 |
| 2,857,394 | de Stevens | Oct. 21, 1958 |

OTHER REFERENCES

Chemical Abstracts, 16, 3101 (Abstract of Brit. Med. J., 1922, I, 514–5). (Copy in Sci. Libr.).

Chemical Abstracts, 19, 530 (Abstract of Proc. Roy Soc., London, 96B, 317–33, 1924). (Copy in Sci. Libr.).

UNITED STATES PATENT OFFICE
CERTIFICATE OF CORRECTION

Patent No. 3,044,875  July 17, 1962

Johannes Götze

It is hereby certified that error appears in the above numbered patent requiring correction and that the said Letters Patent should read as corrected below.

Column 2, lines 16 to 21, formula II should appear as shown below instead of as in the patent:

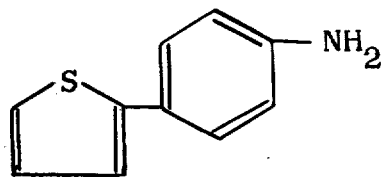

column 3, lines 50 to 56, formula VIII should appear as shown below instead of as in the patent:

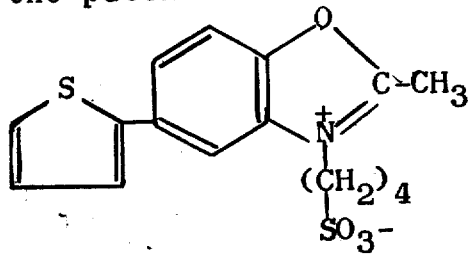

column 4, line 45, strike out "Asymmetrical carbocyanines"; line 46, for "are obtained" read -- one obtains asymmetrical carbocyanines --; same column 4, line 51, for "gutaconic" read -- glutaconic --; column 6, lines 49 to 56, the formula should appear as shown below instead of as in the patent:

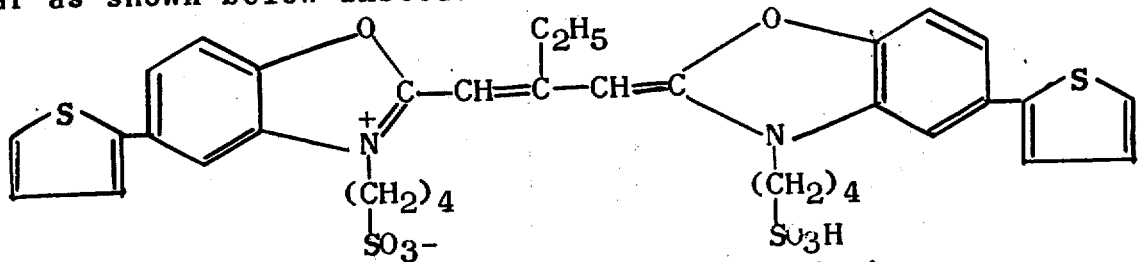

column 7, line 45, for "rhodanene" read -- rhodanine --.

Signed and sealed this 14th day of May 1963.

(SEAL)
Attest:

ERNEST W. SWIDER

DAVID L. LADD
Commissioner of